US011582727B2

(12) United States Patent
Zhou

(10) Patent No.: US 11,582,727 B2
(45) Date of Patent: Feb. 14, 2023

(54) METHOD AND APPARATUS FOR TRANSMITTING CONTROL INFORMATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 262 days.

(21) Appl. No.: 16/637,742

(22) PCT Filed: Aug. 9, 2017

(86) PCT No.: PCT/CN2017/096649
§ 371 (c)(1),
(2) Date: Feb. 8, 2020

(87) PCT Pub. No.: WO2019/028701
PCT Pub. Date: Feb. 14, 2019

(65) Prior Publication Data
US 2020/0213988 A1 Jul. 2, 2020

(51) Int. Cl.
*H04W 72/04* (2009.01)
(52) U.S. Cl.
CPC ............... *H04W 72/0406* (2013.01)
(58) Field of Classification Search
CPC ............ H04W 72/0406; H04W 72/042; H04L 1/00; H04L 5/00; H04L 1/0071; H04L 5/0053
See application file for complete search history.

(56) References Cited

U.S. PATENT DOCUMENTS

| 7,940,795 | B2* | 5/2011 | Frederiksen | .......... H04W 28/18 |
| | | | | 370/468 |
| 10,980,019 | B2* | 4/2021 | Horiuchi | ............. H04W 72/044 |
| 11,108,529 | B2* | 8/2021 | Su | .......................... H04L 5/0094 |
| 2008/0310362 | A1* | 12/2008 | McBeath | ............. H04L 5/0073 |
| | | | | 370/330 |
| 2012/0113914 | A1* | 5/2012 | Zhao | ................. H04W 72/1289 |
| | | | | 370/329 |

(Continued)

FOREIGN PATENT DOCUMENTS

| CN | 102215507 A | 10/2011 |
| CN | 102783064 A | 11/2012 |

(Continued)

OTHER PUBLICATIONS

International search report of PCT application No. PCT/CN2017/096649 dated Dec. 27, 2017.

(Continued)

*Primary Examiner* — Ayaz R Sheikh
*Assistant Examiner* — Tarell A Hampton
(74) *Attorney, Agent, or Firm* — Syncoda LLC; Feng Ma

(57) ABSTRACT

A method for transmitting control information includes: when a condition of sending the control information is met, interleaving common control information of each user equipment (UE) working on a target bandwidth part (BWP) and interleaving specific control information of each UE; and sending the interleaved common control information by means of a first time-frequency resource, and sending the interleaved specific control information by means of a second time-frequency resource.

17 Claims, 5 Drawing Sheets

(56) References Cited

U.S. PATENT DOCUMENTS

| | | | |
|---|---|---|---|
| 2013/0064216 A1* | 3/2013 | Gao | H04L 1/1861 |
| | | | 370/330 |
| 2018/0048435 A1* | 2/2018 | Islam | H04L 5/0007 |
| 2018/0183551 A1* | 6/2018 | Chou | H04L 5/0098 |
| 2018/0219606 A1* | 8/2018 | Ng | H04W 72/0453 |
| 2018/0227922 A1* | 8/2018 | Lee | H04W 28/22 |
| 2019/0036586 A1* | 1/2019 | Bradford | H04W 72/0413 |
| 2019/0140776 A1* | 5/2019 | Seo | H04B 7/0482 |
| 2020/0389917 A1* | 12/2020 | Kwak | H04W 74/04 |
| 2021/0120537 A1* | 4/2021 | Lei | H04L 5/0053 |

FOREIGN PATENT DOCUMENTS

| | | |
|---|---|---|
| CN | 102892201 A | 1/2013 |
| WO | 2014148736 A1 | 9/2014 |

OTHER PUBLICATIONS

First office action of Chinese application No. 201780000789.2 dated Sep. 18, 2019.

* cited by examiner

METHOD AND APPARATUS FOR TRANSMITTING CONTROL INFORMATION

CROSS-REFERENCE TO RELATED APPLICATION

The present application is a national stage of International Application No. PCT/CN2017/096649 filed on Aug. 9, 2017, the disclosure of which is hereby incorporated by reference in its entirety.

TECHNICAL FIELD

The present disclosure relates to the field of communication technology, and more particularly to a method and an apparatus for transmitting control information.

BACKGROUND

Similar to LTE (Long-Term Evolution) technology in 4G (Fourth-generation of Wireless Mobile Telecommunications Technology), NR (New Radio) technology in 5G (Fifth-generation of Wireless Mobile Telecommunications Technology) is also an air interface technology with a time-frequency structure, where time-frequency resources are used, a time dimension is divided into different OFDM (Orthogonal Frequency Division Multiplexing) symbols, and a frequency dimension is divided into different sub-carriers.

In the 5G, the frequency deployed for the NR is mostly in a high-frequency range and may be deployed from 3.3 GHz to 24 GHz, and thus, a working carrier frequency range of the NR in the 5G may be much larger than the working carrier frequency range of the LTE in the 4G. In this way, for one UE (User Equipment) and from the perspective of radio frequency capability and power consumption, a working carrier of the NR in the 5G is divided into a plurality of BWPs (Band Width Part), and one BWP thus is a set of some frequency resources on one working carrier, and the UE is configured to work on at least one BWP at the same time.

There is one CORESET (Control Resource Set) present in each BWP correspondingly, and the CORESET is a set of all the control information in the BWP to which it belongs. The CORESET may be divided into a Common CORESET and a UE Specific CORESET. The Common CORESET includes the common control information of the UE working on the BWP, and the Specific CORESET includes the specific control information of the UE working on the BWP. In order to acquire a frequency diversity gain for the CORESET, a base station generally interleave the common control information in the Common CORESET and the specific control information in the UE Specific CORESET every preset period, for example, by dividing the common control of each UE working on the BWP into multiple parts; dividing the specific control information of each UE working on the BWP into multiple parts; scrambling the order; and arranging the multiple parts of common control information and the multiple parts of specific control information in a staggered pattern, so that the multiple parts of the specific control information of each UE are not adjacent, and the multiple parts of the common control information are not adjacent. Then, the interleaved Common CORESET and UE Specific CORESET are sent to the UE by means of preset time-frequency resources in the BWP; and the UE working on the BWP may perform de-interleaving on the preset time-frequency resources to obtain the common control information and specific control information belonging thereto; and in this way, for certain UE, the common control information and the specific control information are not sent on the adjacent resources, and may not lost completely even if they are lost.

During the implementation of the present disclosure, the inventor has found that the prior art has at least the following problems:

to acquire the common control information and specific control information of the UE, the UE needs to perform de-interleaving on the interleaved Common CORESET and UE Specific CORESET. In this way, each UE has to perform de-interleaving on all the interleaved Common CORESET and UE Specific CORESET to acquire the common control information and specific control information corresponding thereto, leading to low speed of the UE for acquiring the control information.

SUMMARY

To solve the problems existing in the related art, embodiments of the present disclosure provide a method and an apparatus for transmitting control information. The technical solutions are as follows:

According to the first aspect of the embodiments of the present disclosure, there is provided a method for transmitting control information, including:

when a condition of sending the control information is met, interleaving common control information of each user equipment (UE) working on a target bandwidth part (BWP) and interleaving specific control information of each UE; and sending the interleaved common control information by means of a first time-frequency resource, and sending the interleaved specific control information by means of a second time-frequency resource, so that the UE working on the target BWP performs de-interleaving on the first time-frequency resource to obtain the common control information belonging thereto, and performs de-interleaving on the second time-frequency resource to obtain the specific control information belonging thereto.

Optionally, the method further includes:

determining a number of resource element group (REG) Bundle units required to be occupied respectively by the common control information of each UE, and determining a number of REG Bundle units required to be occupied respectively by the specific control information of each UE, wherein the interleaving common control information of each user equipment (UE) working on a target bandwidth part (BWP) and interleaving specific control information of each UE includes:

interleaving the common control information based on the number of REG Bundle units required to be occupied respectively by the common control information of each UE, and interleaving the specific control information based on the number of REG Bundle units required to be occupied respectively by the specific control information of each UE.

Optionally, the method further includes:

sending an identifier of the first time-frequency resource and an identifier of the second time-frequency resource to the UE working on the target BWP by means of a broadcast signaling, an upper-layer signaling, or a physical-layer signaling.

According to the second aspect of the embodiments of the present disclosure, there is provided a method for transmitting control information, including:

when a condition of sending the control information is met, determining user equipment (UE) satisfying a condition of acquiring common control information among UE working on a target bandwidth part (BWP);

interleaving specific control information and common control information of each of the determined UE and interleaving specific control information of each of other UE working on the target BWP than the determined UE; and sending the interleaved specific control information and common control information by means of a first time-frequency resource, and sending the interleaved specific control information of the other UE by means of a second time-frequency resource, so that the determined UE performs de-interleaving on the first time-frequency resource to obtain the common control information and specific control information belonging thereto, and the other UE performs de-interleaving on the second time-frequency resource to obtain the specific control information belonging thereto, wherein the first time-frequency resource and the second time-frequency resource have no intersection.

Optionally, the method further includes:

acquiring a number of resource element group (REG) Bundle units required to be occupied respectively by the specific control information of each of the determined UE, and a number of REG Bundle units required to be occupied respectively by the common control information of each of the determined UE, and determining a number of REG Bundle units required to be occupied respectively by the specific control information of each of the other UE, wherein the interleaving specific control information and common control information of each of the determined UE and interleaving specific control information of each of other UE working on the target BWP than the determined UE includes:

interleaving the specific control information and common control information of the determined UE based on the number of REG Bundle units required to be occupied respectively by the specific control information of each of the determined UE and the number of REG Bundle units required to be occupied respectively by the common control information of each UE, and interleaving the specific control information of the other UE based on the number of REG Bundle units required to be occupied respectively by the specific control information of each of the other UE.

Optionally, the determining user equipment (UE) satisfying a condition of acquiring common control information includes:

determining UE having a de-interleaving capability greater than a preset intensity and UE requiring to receive the common control information among other UE working on the target BWP than the UE having the de-interleaving capability greater than the preset intensity.

Optionally, the determining UE having a de-interleaving capability greater than a preset intensity includes:

determining UE executing a service of which a type is a preset service type, as the UE having the de-interleaving capability greater than the preset intensity.

Optionally, the determining UE having a de-interleaving capability greater than a preset intensity includes:

determining UE of which a capability level is a preset level, as the UE having the de-interleaving capability greater than the preset intensity.

Optionally, the determining user equipment (UE) satisfying a condition of acquiring common control information includes:

determining UE requiring to receive the common control information.

Optionally, the method further includes:

sending an identifier of the first time-frequency resource and an identifier of the second time-frequency resource to the UE working on the target BWP by means of a broadcast signaling, an upper-layer signaling, or a physical-layer signaling.

According to the third aspect of the embodiments of the present disclosure, there is provided an apparatus for transmitting control information, including:

an interleaving module configured to, when a condition of sending the control information is met, interleave common control information of each user equipment (UE) working on a target bandwidth part (BWP) and interleave specific control information of each UE; and a sending module configured to send the interleaved common control information by means of a first time-frequency resource, and send the interleaved specific control information by means of a second time-frequency resource, so that the UE working on the target BWP performs de-interleaving on the first time-frequency resource to obtain the common control information belonging thereto, and performs de-interleaving on the second time-frequency resource to obtain the specific control information belonging thereto.

Optionally, the apparatus further includes:

a determining module configured to determine a number of resource element group (REG) Bundle units required to be occupied respectively by the common control information of each UE, and determine a number of REG Bundle units required to be occupied respectively by the specific control information of each UE, wherein the interleaving module is configured to:

interleave the common control information based on the number of REG Bundle units required to be occupied respectively by the common control information of each UE, and interleave the specific control information based on the number of REG Bundle units required to be occupied respectively by the specific control information of each UE.

Optionally, the sending module is further configured to:

send an identifier of the first time-frequency resource and an identifier of the second time-frequency resource to the UE working on the target BWP by means of a broadcast signaling, an upper-layer signaling, or a physical-layer signaling.

According to the fourth aspect of the embodiments of the present disclosure, there is provided an apparatus for transmitting control information, including:

a determining module configured to, when a condition of sending the control information is met, determine user equipment (UE) satisfying a condition of acquiring common control information among UE working on a target bandwidth part (BWP);

an interleaving module configured to interleave specific control information and common control information of each of the determined UE and interleave specific control information of each of other UE working on the target BWP than the determined UE; and a sending module configured to send the interleaved specific control information and common control information by means of a first time-frequency resource, and send the interleaved specific control information of the other UE by means of a second time-frequency resource, so that the determined UE performs de-interleaving on the first time-frequency resource to obtain the common control information and specific control information belonging thereto, and the other UE performs de-interleaving on the second time-frequency resource to obtain the specific control information belonging thereto, wherein the first time-frequency resource and the second time-frequency resource have no intersection.

Optionally, the method further comprises:

an acquiring module configured to acquire a number of resource element group (REG) Bundle units required to be occupied respectively by the specific control information of each of the determined UE, and a number of REG Bundle units required to be occupied respectively by the common control information of each of the determined UE, and determine a number of REG Bundle units required to be occupied respectively by the specific control information of each of the other UE, wherein the interleaving module is configured to:

interleaving the specific control information and common control information of the determined UE based on the number of REG Bundle units required to be occupied respectively by the specific control information of each of the determined UE and the number of REG Bundle units required to be occupied respectively by the common control information of each UE, and interleaving the specific control information of the other UE based on the number of REG Bundle units required to be occupied respectively by the specific control information of each of the other UE.

Optionally, the determining module is configured to:

determining UE having a de-interleaving capability greater than a preset intensity and UE requiring to receive the common control information among other UE working on the target BWP than the UE having the de-interleaving capability greater than the preset intensity.

Optionally, the determining module is configured to:

determining UE executing a service of which a type is a preset service type, as the UE having the de-interleaving capability greater than the preset intensity.

Optionally, the determining module is configured to:

determining UE of which a capability level is a preset level, as the UE having the de-interleaving capability greater than the preset intensity.

Optionally, the determining module is configured to:

determining UE requiring to receive the common control information.

Optionally, the sending module is configured to:

sending an identifier of the first time-frequency resource and an identifier of the second time-frequency resource to the UE working on the target BWP by means of a broadcast signaling, an upper-layer signaling, or a physical-layer signaling.

According to the fifth aspect of the embodiments of the present disclosure, a computer readable storage medium, which stores at least one instruction, at least one program, a code set, or an instruction set, the at least one instruction, the at least one program, the code set or the instruction set is loaded and executed by a processor to implement the method for transmitting control information according to any one of the first aspect.

According to the sixth aspect of the embodiments of the present disclosure, a computer readable storage medium, which stores at least one instruction, at least one program, a code set, or an instruction set, the at least one instruction, the at least one program, the code set or the instruction set is loaded and executed by a processor to implement the method for transmitting control information according to any one of the second aspect.

According to the seventh aspect of the embodiments of the present disclosure, an apparatus for transmitting control information, comprising a processor and a memory, wherein at least one instruction, at least one program, a code set, or an instruction set is stored on the memory, and is loaded and executed by the processor to implement the method for transmitting control information according to any one of the first aspect.

According to the eighth aspect of the embodiments of the present disclosure, an apparatus for transmitting control information, comprising a processor and a memory, wherein at least one instruction, at least one program, a code set, or an instruction set is stored on the memory, and is loaded and executed by the processor to implement the method for transmitting control information according to any one of the second aspect.

The technical solutions provided by the embodiments of the present disclosure may include the following beneficial effects.

In the embodiments of the present disclosure, when the condition of sending the control information is met, the common control information of each UE working on the target BWP is interleaved, and the specific control information of each UE is interleaved; and the interleaved common control information is sent by means of the first time-frequency resource, and the interleaved specific control information is sent by means of the second time-frequency resource, so that the UE working on the target BWP performs de-interleaving on the first time-frequency resource to obtain the common control information belonging thereto, and performs de-interleaving on the second time-frequency resource to obtain the specific control information belonging thereto. In this way, the common control information and the specific control information of the UE working on the BWP are interleaved respectively. Some UE not requiring to acquire the common control information may only perform de-interleaving on the specific control information to obtain the specific control information belonging thereto, thereby improving the speed of acquiring the specific control information. Some UE not requiring to acquire the specific control information belonging thereto may only perform de-interleaving on the common control information and then execute blind detection to obtain the common control information belonging thereto, thereby improving the speed of the UE for acquiring the common control information, which, for all the UE working on the BWP, may further improve the overall speed of the UE for acquiring the control information.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

Embodiment 1

An exemplary embodiment of the present disclosure provides a method for transmitting control information, and an executive body of the method for transmitting control information may be a base station.

The base station may be provided with a processor, a transceiver, a memory, etc. The processor may be configured for relevant processes during the transmission of control information; the transceiver may be configured to receive and send data; and the memory may be configured to store data required and data produced during the transmission of control information.

Figure 1:
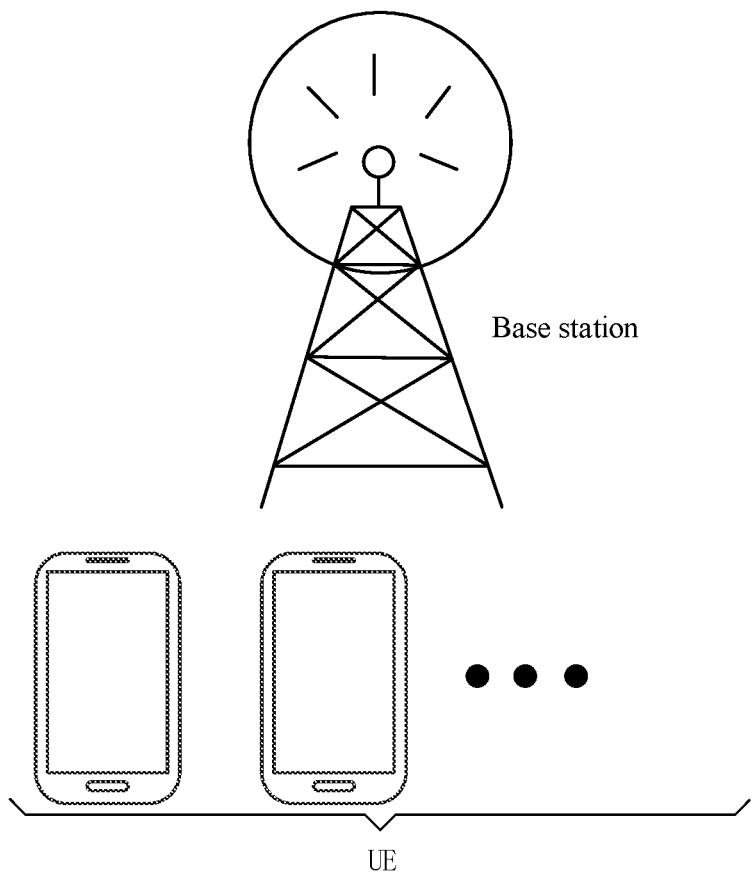
FIG. 1 is a schematic diagram of an application scenario of transmitting control information according to an embodiment of the present disclosure.

Before the implementation, as shown in FIG. 1, an application scenario of this embodiment of the present disclosure is first introduced. Devices involved in the application scenarios include a base station and a UE; the UE may be a mobile phone, etc.; the base station may send control information (common control information and UE specific control information) by means of time-frequency resources; and the UE may parse the time-frequency resources to obtain the common control information and the specific control information belonging thereto.

Figure 2:
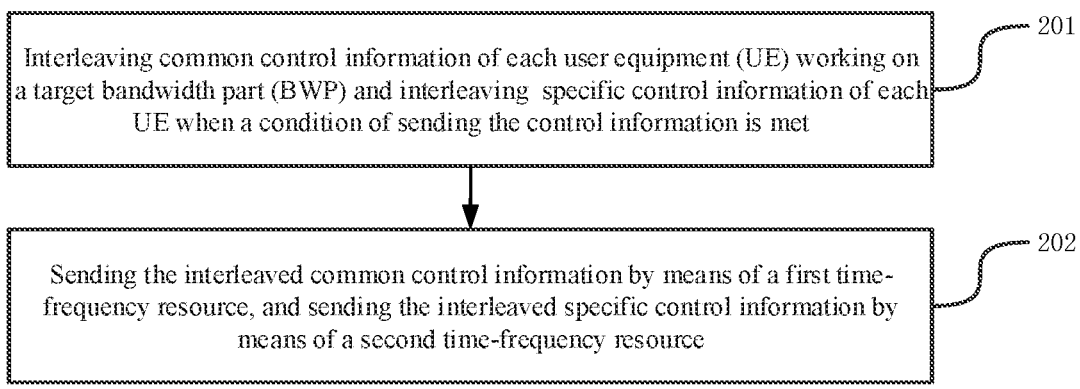
FIG. 2 is a schematic flowchart of a method for transmitting control information according to an embodiment of the present disclosure.

As shown in FIG. 2, a process flow of the method may include the following steps.

In step 201, when a condition of sending the control information is met, common control information of each user equipment (UE) working on a target bandwidth part (BWP) is interleaved and specific control information of each UE is interleaved.

Among them, the target BWP is any BWP. Both the common control information and the specific control information include scheduling, controlling and other signaling, and the common control information and the specific control information are different for different UE. The UE may acquire the common control information by searching, i.e., blind detection, and may acquire the specific control information by using a location indicated by the base station.

In an implementation, the base station sends the control information to all the UE working on a target BWP every preset period, which may be set as such as 1 minute by a technician. Whenever a certain UE switches to the target BWP, the base station may record the UE as the UE working on the target BWP; and when the UE switches from the target BWP to another BWP or is off-line, the UE is no longer recorded as the UE working on the target BWP.

When detecting that a period of sending the control information is met, the base station may determine UE currently working on the target BWP and then determine the common control information and specific control information of each UE, and interleave the common control information of each UE and interleave the specific control information of each UE.

Optionally, the common control information may be interleaved based on the number of REG (Resource Element Group) Bundle units required to be occupied respectively by the common control information of each UE, and the specific control information may be interleaved based on the number of REG Bundle units required to be occupied respectively by the specific control information of each UE. The corresponding processes are as follows:

determining a number of REG Bundle units required to be occupied respectively by the common control information of each UE working on the target BWP, and determining a number of REG Bundle units required to be occupied respectively by the specific control information of each UE; and interleaving the common control information based on the number of REG Bundle units required to be occupied respectively by the common control information of each UE, and interleaving the specific control information based on the number of REG Bundle units required to be occupied respectively by the specific control information of each UE.

Among them, the REG Bundle units are bound by a plurality of REGs. For each UE, the number of REGs included in a REG Bundle unit is generally fixed, such as being fixed to 2, 3, etc., and the number of REGs included in the REG Bundle unit may be the same or different for different UE.

In an implementation, when detecting that a period of sending the control information is met, the base station may determine UE currently working on the target BWP, and then may determine a data amount of the common control information to be sent this time of each UE. The data amount that each REG can map is generally the same. For each UE, by dividing the data amount of the common control information by the data amount that each REG can map, if a result is an integer, the integer is the required number of REGs; and if the result is an integer plus a remainder, the integer is incremented by one to obtain the required number of REGs. For each UE, the base station records the number of REGs included in the REG Bundle unit; by dividing the number of REGs obtained before by the number of REGs included in the REG Bundle unit, if a result is an integer, the integer is the number of REG Bundle units required to be occupied by the UE; and if the result is an integer plus a remainder, the integer is incremented by one to obtain the number of REG Bundle units required to be occupied by the UE. For example, when the data amount that can be mapped by each REG is 3k, and the data amount of the common control information of a UE is 30K, 10 REGs are required. For the UE, the number of REGs included in the REG Bundle unit is 2, and in this way, the number of REG Bundle units required to be occupied by the common control information of the UE is 5.

Furthermore, the base station may determine the UE currently working on the target BWP, and then determine the data amount of the specific control information to be transmitted this time for each UE. The data amount that each REG can map is generally the same. For each UE, by dividing the data amount of the specific control information by the data amount that each REG can map, if a result is an integer, the integer is the required number of REGs; and if the result is an integer plus a remainder, the integer is incremented by one to obtain the required number of REGs. For each UE, the base station records the number of REGs included in the REG Bundle unit; by dividing the number of REGs obtained before by the number of REGs included in the REG Bundle unit, if a result is an integer, the integer is the number of REG Bundle units required to be occupied by the UE; and if the result is an integer plus a remainder, the integer is incremented by one to obtain the number of REG Bundle units required to be occupied by the UE.

After determining the number of REG Bundle units required to be occupied respectively by the common control information of each UE, the base station may equally divide the common control information by the number of REG Bundle units required to be occupied for each UE, and thus, each UE may obtain multiple parts of common control information. Then, the base station may scramble the order of and then arrange the multiple parts of common control information of each UE, so that each part of common control information of each UE is not adjacent, thereby completing the interleaving of the common control information. For example, there are three UE working on the BWP, namely A, B, and C. The number of REG Bundle units required to be occupied by the common control information of A is 4; the number of REG Bundle units required to be occupied by the common control information of B is 4; and the number of REG Bundle units required to be occupied by the common control information of C is 4. The common control information of A can be divided into A-1, A-2, A-3, and A-4, the common control information of B can be divided into B-1, B-2, B-3, and B-4; and the common control information of C can be divided into C-1, C-2, C-3, and C-4. After interleaving, the arrangement order of the common control information may be A-1, B-1, C-2, A-2, B-3, C-1, A-3, B-2, C-4, A-4, B-4, C-3.

The base station may equally divide the specific control information by the number of REG Bundle units required to be occupied for each UE, and thus, each UE may obtain multiple parts of specific control information. Then, the base station may scramble the order of and then arrange the multiple parts of specific control information of each UE, so that each part of specific control information of each UE is not adjacent, thereby completing the interleaving of the common control information. For example, there are three UE working on the BWP, namely A, B, and C. The number of REG Bundle units required to be occupied by the specific control information of A is 4; the number of REG Bundle units required to be occupied by the specific control information of B is 4; and the number of REG Bundle units required to be occupied by the specific control information of C is 4. The specific control information of A can be divided into A-4, A-5, A-6, and A-7; the specific control information of B can be divided into B-4, B-5, B-6, and B-7, and the specific control information of C can be divided into C-4, C-5, C-6, and C-7. After interleaving, the arrangement order of the specific control information may be A-4, B-4, C-5, A-5, B-6, C-4, A-6, B-5, C-7, A-7, B-7, C-6.

In step 202, the interleaved common control information is sent by means of a first time-frequency resource, and the interleaved specific control information is sent by means of a second time-frequency resource.

Among them, the first time-frequency resource and the second time-frequency resource may be either time-frequency resources preset by a technician, or time-frequency resources configured by the base station; and the base station and the UE store the identifier of the first time-frequency resource and the identifier of the second time-frequency resource. The first time-frequency resource is configured to transmit the interleaved common control information, and the second time-frequency resource is configured to transmit the interleaved specific control information. The first time-frequency resource includes multiple REGs, the second time-frequency resource includes multiple REGs, and the first time-frequency resource and the second time-frequency resource have no overlapping REGs.

Figure 3:
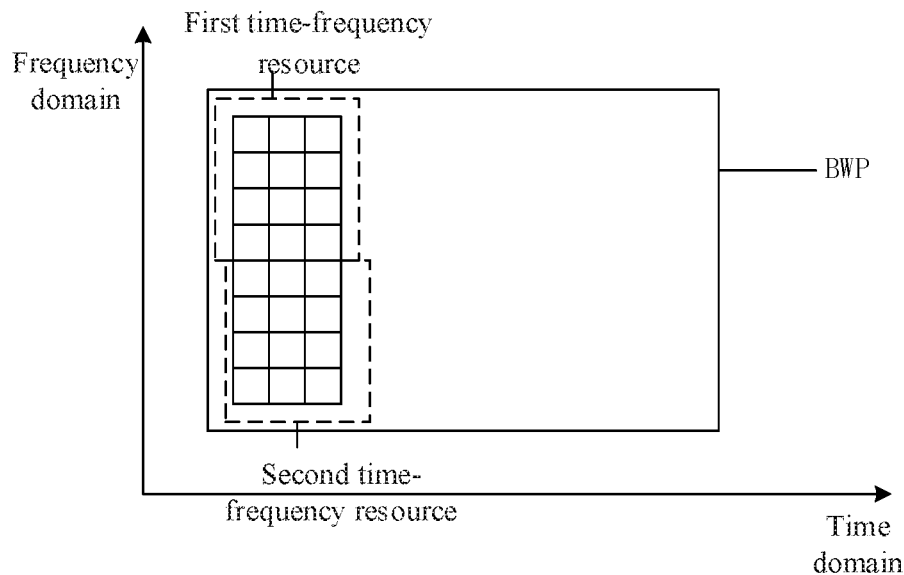
FIG. 3 is a schematic diagram of interleaving according to an embodiment of the present disclosure.

In an implementation, for the case where the first time-frequency resource and the second time-frequency resource are the time-frequency resources preset by the technician, after interleaving the common control information and the specific control information respectively, the base station may acquire the pre-stored identifier of the first time-frequency resource and the pre-stored identifier of the second time-frequency resource, then search for the first time-frequency resource by using the identifier of the first time-frequency resource, map the interleaved common control information to the first time-frequency resource according to an arrangement order, and send the interleaved common control information by means of the first time-frequency resource; and the base station may search for the second time-frequency resource by using the identifier of the second time-frequency resource, map the interleaved specific control information to the second time-frequency resource according to an arrangement order, and send the interleaved specific control information by means of the second time-frequency resource. For example, as shown in FIG. 3, also with the example in step 201 as an example, the first time-frequency resource is an REG Bundle unit having four rows and three columns, with 12 REG Bundle units in total; from the first row, A-1, B-1, and C-2 are mapped in sequence from left to right; in the second row, A-2, B-3, and C-1 are mapped in sequence from left to right; and in the third row, A-3, B-2, and C-4 are mapped in sequence from left to right. The second time-frequency resource is also an REG Bundle unit having four rows and three columns, with 12 REG Bundle units in total; from the first row, A-4, B-4, and C-5 are mapped in sequence from left to right; in the second row, A-5, B-6, and C-4 are mapped in sequence from left to right; and in the third row, A-7, B-7, and C-6 are mapped in sequence from left to right.

When the UE working on the target BWP reaches the period of acquiring the control information, the UE may acquire the pre-stored identifier of the first time-frequency resource and the pre-stored identifier of the second time-frequency resource. If the UE needs to acquire the common control information belonging thereto, the UE may search for the first time-frequency resource by using the identifier of the first time-frequency resource, perform de-interleaving on the first time-frequency resource, and then perform blind detection to obtain the common control information belonging thereto. If the UE needs to acquire the specific control information belonging thereto, the UE may search for the second time-frequency resource by using the identifier of the second time-frequency resource, and based on a location of the time-frequency resource of the specific control information as indicated by the base station, perform de-interleaving on the second time-frequency resource to obtain the specific control information belonging thereto.

For the case where the first time-frequency resource and the second time-frequency resource are the time-frequency resources configured by the base station, after interleaving the common control information and the specific control information respectively, the base station may determine a first time-frequency resource for mapping the interleaved common control information and a second time-frequency resource for mapping the interleaved specific control information, map the interleaved common control information to the first time-frequency resource in sequence according to an arrangement order, and send the interleaved common control information by means of the first time-frequency resource; and the base station may map the interleaved specific control information to the second time-frequency resource according to an arrangement order, and send the interleaved specific control information by means of the second time-frequency resource.

When the UE working on the target BWP reaches the period of acquiring the control information, the UE may acquire the pre-stored identifier of the first time-frequency resource and the pre-stored identifier of the second time-frequency resource. If the UE needs to acquire the common control information belonging thereto, the UE may search for the first time-frequency resource by using the identifier of the first time-frequency resource, perform de-interleaving on the first time-frequency resource, and then perform blind detection to obtain the common control information belonging thereto. If the UE needs to acquire the specific control information belonging thereto, the UE may search for the second time-frequency resource by using the identifier of the second time-frequency resource, and based on a location of the time-frequency resource of the specific control information as indicated by the base station, perform de-interleaving on the second time-frequency resource to obtain the specific control information belonging thereto.

In this way, some UE not requiring to acquire the common control information may only perform de-interleaving on the specific control information to obtain the specific control information belonging thereto, thereby improving the speed of acquiring the specific control information. Some UE not requiring to acquire the specific control information belonging thereto may only perform de-interleaving on the common control information and then execute blind detection to obtain the common control information belonging thereto, thereby improving the speed of the UE for acquiring the common control information, which, for the UE working on the BWP, may improve the overall speed of the UE for acquiring the control information. Furthermore, when acquiring the common control information, the UE working on the BWP may only deinterleave the interleaved common control information to obtain the common control information belonging thereto; and when acquiring the specific control information, the UE may only de-interleave the interleaved specific control information to obtain the specific control information belonging thereto, rather than de-interleaving the common control information interleaved with specific control information together, so that the overall speed of the UE for acquiring the control information can be improved.

It should be noted that the above UE not requiring to obtain the common control information refer to UE that periodically receive the common control information sent by the base station, which do not need to receive the common control information until the period of receiving the common control information is met; and the UE not requiring to obtain the specific control information refer to UE that periodically receive specific control information sent by the base station, which do not need to receive the specific control information until a period of receiving the specific control information is met.

It should be noted that, for the target BWP, the time-frequency resources for sending the control information are generally fixed; both the first time-frequency resource and the second time-frequency resource are parts of the time-frequency resources; and the time-frequency resource for sending the common control information may be different from the time-frequency resource for sending the specific control information each time.

It should also be noted that the base station may send indication information indicating the location of the time-frequency resource of the specific control information to the UE, and in general, an arrangement order of the interleaved specific control information is sent.

Optionally, for the case where the first time-frequency resource and the second time-frequency resource are time-frequency resources configured by the base station, the base station should send the identifier of the first time-frequency resource and the identifier of the second time-frequency resource to the UE, and a corresponding process may be as follows:

sending an identifier of the first time-frequency resource and an identifier of the second time-frequency resource to the UE working on the target BWP by means of a broadcast signaling, an upper-layer signaling, or a physical-layer signaling.

Among them, the identifier of the first time-frequency resource and the identifier of the second time-frequency resource may be a combination of a number of symbols and a sub-carrier frequency range. For example, the identifier of the first time-frequency resource is the number of symbols, which is 1, and the sub-carrier frequency range is 10 MHz-12 MHz; and the identifier of the second time-frequency resource is the number of symbols, which is 2 and 3, and the sub-carrier frequency range is 10 MHz-12 MHz, etc.

In an implementation, after determining the first time-frequency resource and the second time-frequency resource and before sending the control information, the base station may send an identifier of the first time-frequency resource and an identifier of the second time-frequency resource to the terminal by means of a broadcast signaling, an upper-layer signaling, or a physical-layer signaling. The upper-layer signaling may be a signaling based on RRC (Radio Resource Control), or a signaling sent via MAC (Media Access Control).

In this embodiment of the present disclosure, when the condition of sending the control information is met, the common control information of each UE working on the target BWP is interleaved, and the specific control information of each UE is interleaved; and the interleaved common control information is sent by means of the first time-frequency resource, and the interleaved specific control information is sent by means of the second time-frequency resource, so that the UE working on the target BWP performs de-interleaving on the first time-frequency resource to obtain the common control information belonging thereto, and performs de-interleaving on the second time-frequency resource to obtain the specific control information belonging thereto. In this way, the common control information and the specific control information of the UE working on the BWP are interleaved respectively. Some UE not requiring to acquire the common control information may only perform de-interleaving on the specific control information to obtain the specific control information belonging thereto, thereby improving the speed of acquiring the specific control information. Some UE not requiring to acquire the specific control information belonging thereto may only perform de-interleaving on the common control information and then execute blind detection to obtain the common control information belonging thereto, thereby improving the speed of the UE for acquiring the common control information, which, for all the UE working on the BWP, may further improve the overall speed of the UE for acquiring the control information.

Embodiment 2

An exemplary embodiment of the present disclosure provides another method for transmitting control information, and an executive body of the method for transmitting control information may be a base station.

The base station may be provided with a processor, a transceiver, a memory, etc. The processor may be configured for relevant processes during the transmission of control information; the transceiver may be configured to receive and send data; and the memory may be configured to store data required and data produced during the transmission of control information.

Before the implementation, an application scenario of this embodiment of the present disclosure is first introduced (as shown in FIG. 1). Devices involved in the application scenarios include a base station and a UE; the UE may be a mobile phone, etc.; the base station may send control information (common control information and UE specific control information) by means of time-frequency resources; and the UE may parse the time-frequency resources to obtain the common control information and the specific control information belonging thereto.

Figure 4:
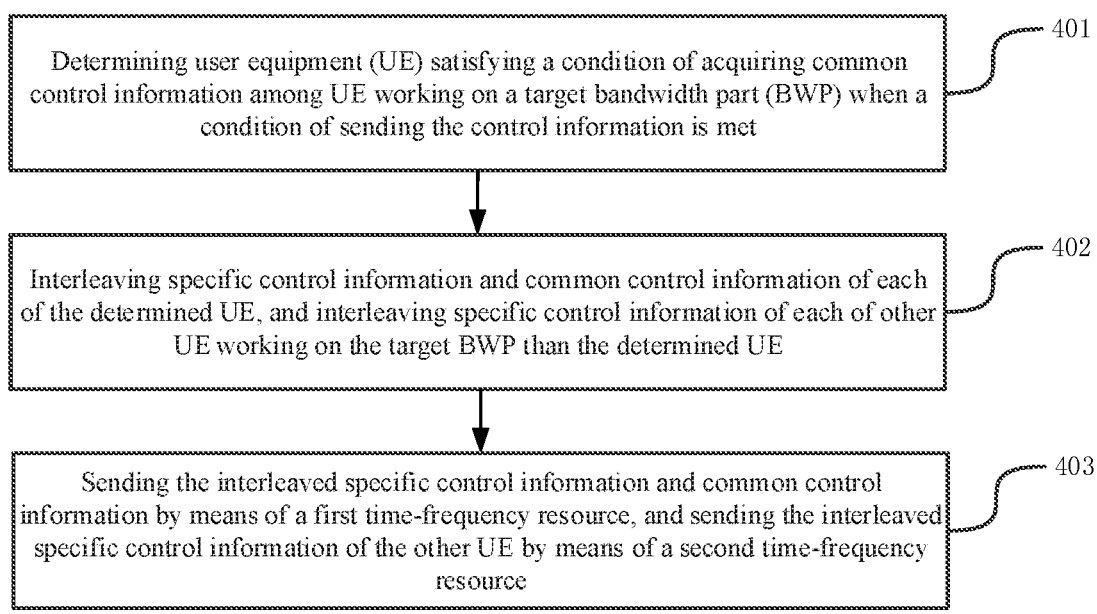
FIG. 4 is a schematic flowchart of a method for transmitting control information according to another embodiment of the present disclosure.

As shown in FIG. 4, a process flow of the method may include the following steps.

In step 401, when a condition of sending the control information is met, user equipment (UE) satisfying a condition of acquiring common control information is determined among UE working on a target bandwidth part (BWP).

Among them, the target BWP is any BWP.

In an implementation, the base station sends control information to all UE working on a target BWP every preset period, which may be set by a technician as, such as, 1 minute. Whenever a UE switches to the target BWP, the base station may record the UE as a UE working on the target BWP; and when the UE switches from the target BWP to another BWP or is off-line, the UE is no longer recorded as a UE working on the target BWP. When detecting that a period of sending the control information is met, the base station may determine UE working on the target BWP, and then determine UE satisfying a condition of acquiring common control information (the details will be described later).

Optionally, there are a variety of methods for determining the UE satisfying the condition of acquiring common control information, with two feasible methods given below.

In a first method, UE requiring to receive the common control information is determined.

In an implementation where some of the UE working on the target BWP are less frequent to use the common control information, or the change frequency of the common control information is low, the base station may send the common control information to these UE every other preset number of periods of sending the control information. The preset number may be preset as such as 5 by the technician, and stored in the base station and the UE. The base station may determine the UE working on the target BWP, and then determine whether there is a UE not requiring to receive the common control information among these UE; and if so, the UE not requiring to receive the common control information are deleted from the UE working on the target BWP, thereby obtaining the UE requiring to receive the common control information. In this way, the UE not requiring to receive the common control information may directly de-interleave the specific control information.

In a second method, UE having a de-interleaving capability greater than a preset intensity and UE requiring to receive the common control information among the UE working on the target BWP other than the UE having the de-interleaving capability greater than the preset intensity are determined.

Among them, the preset intensity may be preset by the technician and stored in the base station, and the UE having greater de-interleaving capability may de-interleave and obtain the control information more quickly.

In an implementation, after determining the UE working on the target BWP, the base station may determine UE having the de-interleaving capability greater than the intensity and UE having the de-interleaving capability greater than the present intensity among these UE, then determine other UE working on the target BWP than the UE having the de-interleaving capability greater than the present intensity, and then determine UE requiring to receive the common control information belonging thereto among these UE (the determining method here is the same as the method in the first method.

Optionally, there are a variety of methods for determining UE having a de-interleaving capability greater than a preset intensity, with two feasible methods given below.

In a first method, UE executing a service of which a type is a preset service type is determined as the UE having the de-interleaving capability greater than the preset intensity.

Among them, the preset service type may be preset by the technician and stored in the base station. In general, a UE executing a service corresponding to the preset service type has a high computing capability. For example, a service corresponding to the preset service type is an eMBB (enhanced Mobile Broad Band) service, URLLC (Ultra Reliable Low Latency Communication), etc.

In an implementation, when accessing a network, the UE may send a service type of the service executed thereby by means an upper-layer signaling or a physical-layer signaling, and the base station may store the service type of the UE in correspondence to the UE. The base station pre-stores a preset service type. When detecting that a period of sending the control information is met, the base station may determine UE working on the target BWP, and then, among the UE, acquire UE of which a service type is a preset service type, as the UE having the de-interleaving capability greater than the preset intensity.

In a second method, UE of which a capability level is a preset level is determined as the UE having the de-interleaving capability greater than the preset intensity.

Among them, the capability level may be configured to characterize the computing capability of the UE, and a preset level may be preset as such as level 2 and level 3 by the technician and stored in the base station.

In an implementation, when accessing a network, the UE may send capability information such as maximum transmission rate thereof to the base station; the base station stores a correspondence relation between the capability levels and respective capability values included in the capability information; and after receiving the capability information sent by the UE, the base station may determine the capability level based on the capability information. For example, the maximum transmission rate of 10 Mb is corresponds to the capability level 2. When detecting that a period of sending the control information is met, the base station may determine UE working on the target BWP, and then, among the UE, acquire UE of which a capability level is a preset level, as the UE having the de-interleaving capability greater than the preset intensity.

In step 402, specific control information and common control information of each of the determined UE are interleaved, and specific control information of each of other UE working on the target BWP than the determined UE is interleaved.

Optionally, the specific control information and common control information of the determined UE may be interleaved based on the number of REG Bundle units required to be occupied respectively by the specific control information of each of the determined UE and the number of REG Bundle units required to be occupied respectively by the common control information of each UE, and the specific control information of the other UE may be interleaved based on the number of REG Bundle units required to be occupied respectively by the specific control information of each of the other UE. The corresponding processes may be as follows:

acquiring a number of REG Bundle units required to be occupied respectively by the specific control information of each of the determined UE, and a number of REG Bundle units required to be occupied respectively by the common control information of each of the determined UE, and determining a number of REG Bundle units required to be occupied respectively by the specific control information of each of the other UE working on the target BWP than the determined UE. The specific control information and common control information of the determined UE are interleaved based on the number of REG Bundle units required to be occupied respectively by the specific control information of each of the determined UE and the number of REG Bundle units required to be occupied respectively by the common control information of each UE, and the specific control information of the other UE is interleaved based on the number of REG Bundle units required to be occupied respectively by the specific control information of each of the other UE.

In an implementation, the base station may determine UE satisfying the condition of acquiring the control information, and then determine the data amount of the specific control information and the data amount of the common control information for each UE. The data amount that each REG can map is generally the same. For each UE, by dividing the data amount of the common control information by the data amount that each REG can map, if a result is an integer, the integer is the required number of REGs; and if the result is an integer plus a remainder, the integer is incremented by one to obtain the required number of REGs. For each UE, the base station records the number of REGs included in the REG Bundle unit; by dividing the number of REGs obtained before by the number of REGs included in the REG Bundle unit, if a result is an integer, the integer is the number of REG Bundle units required to be occupied the common control information of the UE; and if the result is an integer plus a remainder, the integer is incremented by one to obtain the number of REG Bundle units required to be occupied by the common control information of the UE. Likewise, the number of REG Bundle units required to be occupied by the specific control information of the UE may also be computed.

Furthermore, the base station may determine other UE currently working on the target BWP than the UE satisfying the condition of acquiring the control information, and then determine the data amount of the specific control information of each of the other UE. The data amount that each REG can map is generally the same. For each UE, by dividing the data amount of the specific control information by the data amount that each REG can map, if a result is an integer, the integer is the required number of REGs; and if the result is an integer plus a remainder, the integer is incremented by one to obtain the required number of REGs. For each UE, the base station records the number of REGs included in the REG Bundle unit; by dividing the number of REGs obtained before by the number of REGs included in the REG Bundle unit, if a result is an integer, the integer is the number of REG Bundle units required to be occupied by the UE; and if the result is an integer plus a remainder, the integer is incremented by one to obtain the number of REG Bundle units required to be occupied by the UE.

After acquiring the determined number of REG Bundle units required to be occupied respectively by the common control information and specific control information of each UE, the base station may equally divide the common control information by the number of REG Bundle units required to be occupied and equally divide the specific control information by the number of REG Bundle units required to be occupied for each UE, and thus, each UE may obtain multiple parts of common control information and multiple parts of specific control information. Then, the base station may scramble the order of and then arrange the multiple parts of common control information and specific control information of each UE, so that both each part of common control information of each UE and each part of specific control information of each UE are not adjacent, thereby completing the interleaving of the common control information and the specific control information. For example, there are three UE working on the BWP, namely A, B, and C. For A, the number of REG Bundle units required to be occupied by the common control information is 4, and the number of REG Bundle units required to be occupied by the specific control information is 3. For B, the number of REG Bundle units required to be occupied by the common control information is 4, and the number of REG Bundle units required to be occupied by the specific control information is 3. For C, the number of REG Bundle units required to be occupied by the common control information is 4, and the number of REG Bundle units required to be occupied by the specific control information is 3. For A, the common control information can be divided into A-1, A-2, A-3, and A-4, and the specific control information can be divided into A-5, A-6, and A-7; for B, the common control information can be divided into B-1, B-2, B-3, and B-4, and the specific control information can be divided into B-5, B-6, and B-7; and for C, the common control information can be divided into C-1, C-2, C-3, and C-4, and the specific control information can be divided into C-5, C-6, and C-7. After interleaving, the arrangement order of the common control information and specific control information may be A-1, A-5, B-1, B-5, C-1, C-5, A-2, A-6, B-2, B-6, C-2, C-6, A-3, A-7, B-3, B-7, C-3, C-7, A-4, B-4, C-4.

For each UE working on the BWP other than the UE satisfying the condition of acquiring the common control information, the base station may equally divide the specific control information by the number of REG Bundle units required to be occupied, and thus, each UE may obtain multiple parts of specific control information. Then, the base station may scramble the order of and then arrange the multiple parts of specific control information of each UE, so that each part of specific control information of each UE is not adjacent, thereby completing the interleaving of the common control information. For example, there are three UE working on the BWP, namely D, E, and F. The number of REG Bundle units required to be occupied by the specific control information of D is 4; the number of REG Bundle units required to be occupied by the specific control information of E is 4; and the number of REG Bundle units required to be occupied by the specific control information of F is 4. The specific control information of D can be divided into D-4, D-5, D-6, and D-7; the specific control information of E can be divided into E-4, E-5, E-6, and e-7; and the specific control information of F can be divided into F-4, F-5, F-6, and F-7. After interleaving, the arrangement order of the specific control information may be D-4, E-4, F-5, D-5, E-6, F-4, D-6, E-5, F-7, D-7, E-7, F-6.

In step 403, the interleaved specific control information and common control information are sent by means of a first time-frequency resource, and the interleaved specific control information of the other UE is sent by means of a second time-frequency resource.

Among them, the first time-frequency resource and the second time-frequency resource may be either time-frequency resources preset by a technician, or time-frequency resources configured by the base station; and the base station and the UE store the identifier of the first time-frequency resource and the identifier of the second time-frequency resource. The first time-frequency resource is configured to transmit the interleaved common control information and the specific control information of the determined UE; and the second time-frequency resource is configured to transmit the interleaved specific control information of other UE. The first time-frequency resource includes multiple REGs, the second time-frequency resource also includes multiple REGs, and the first time-frequency resource and the second time-frequency resource have no overlapping REGs.

Figure 5:
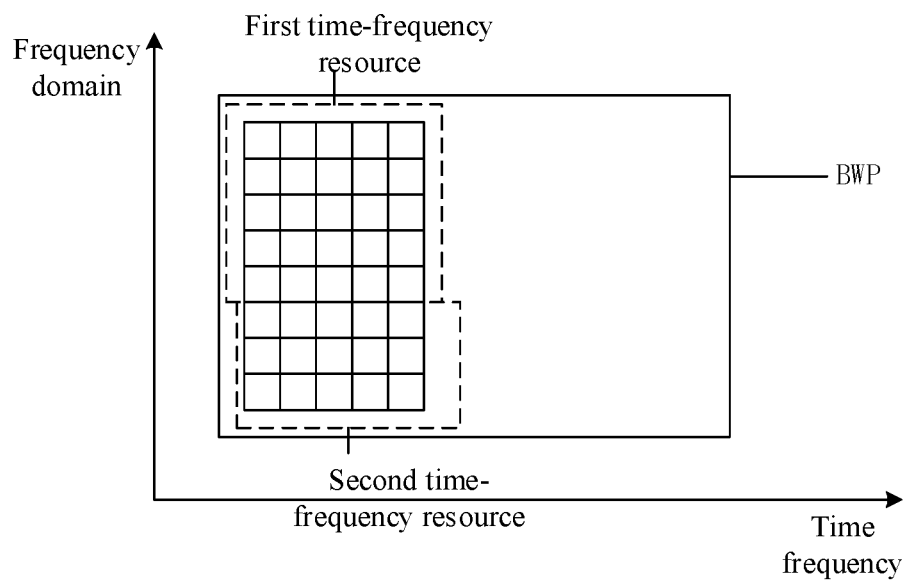
FIG. 5 is a schematic diagram of interleaving according to an embodiment of the present disclosure.

In an implementation, for the case where the first time-frequency resource and the second time-frequency resource are the time-frequency resources preset by the technician, after interleaving the common control information and specific control information of the determined UE respectively, the base station may acquire the pre-stored identifier of the first time-frequency resource and the pre-stored identifier of the second time-frequency resource, then search for the first time-frequency resource by using the identifier of the first time-frequency resource, map the interleaved common control information and specific control information of the determined UE to the first time-frequency resource in sequence according to an arrangement order, and send the interleaved common control information and specific control information of the determined UE by means of the first time-frequency resource. Furthermore, the base station may search for the second time-frequency resource by using the identifier of the second time-frequency resource, map the interleaved specific control information of other UE to the second time-frequency resource according to the arrangement order, and sends the interleaved specific control information of other UE by means of the second time-frequency resource. For example, as shown in FIG. 5, also with the example in step 402 as an example, the first time-frequency resource is an REG Bundle unit having five rows and five columns, with 25 REG Bundle units in total; from the first row, A-1, A-5, B-1, B-5 and C-1 are mapped in sequence from left to right; in the second row, C-5, A-2, A-6, B-2 and B-6 are mapped in sequence from left to right; in the third row, C-2, C-6, A-3, A-7 and B-3 are mapped in sequence from left to right; in the fourth row, B-7, C-3, C-7, A-4 and B-4 are mapped in sequence from left to right; and in the fifth row, C-4 is mapped by the first REG Bundle unit. The second time-frequency resource is also an REG Bundle unit having three rows and five columns, with 12 REG Bundle units in total; from the first row, D-4, E-4, F-5, D-5 and E-6 are mapped in sequence from left to right; in the second row, F-4, D-6, E-5, F-7 and D-7 are mapped in sequence from left to right; and in the third row, E-7 and F-6 are mapped in sequence from left to right.

When the UE working on the target BWP reaches the period of acquiring the control information, the UE may acquire the pre-stored identifier of the first time-frequency resource and the pre-stored identifier of the second time-frequency resource. If the UE needs to acquire the common control information and specific control information belonging thereto, the UE may search for the first time-frequency resource by using the identifier of the first time-frequency resource, perform de-interleaving on the first time-frequency resource, and then perform blind detection to obtain the common control information belonging thereto; and the UE may obtain the specific control information belonging thereto based on a location of the time-frequency resource of the specific control information as indicated by the base station. If the UE needs to acquire the specific control information belonging thereto, the UE may search for the second time-frequency resource by using the identifier of the second time-frequency resource, and based on a location of the time-frequency resource of the specific control information as indicated by the base station, perform de-interleaving on the second time-frequency resource to obtain the specific control information belonging thereto.

For the case where the first time-frequency resource and the second time-frequency resource are the time-frequency resources configured by the base station, after interleaving the common control information and the specific control information respectively, the base station may determine a first time-frequency resource for mapping the interleaved common control information and specific control information and a second time-frequency resource for mapping the interleaved specific control information, map the interleaved common control information to the first time-frequency resource in sequence according to an arrangement order, and send the interleaved common control information by means of the first time-frequency resource; and the base station may map the interleaved specific control information to the second time-frequency resource according to an arrangement order, and send the interleaved specific control information by means of the second time-frequency resource.

When other UE reaches the period of acquiring the control information, the UE may acquire the identifiers of the first time-frequency resource and second time-frequency resource as received from the base station. If the UE needs to acquire the common control information and specific control information belonging thereto, the UE may search for the first time-frequency resource by using the identifier of the first time-frequency resource, perform de-interleaving on the first time-frequency resource, and then perform blind detection to obtain the common control information belonging thereto; and the UE may obtain the specific control information belonging thereto based on a location of the time-frequency resource of the specific control information as indicated by the base station. If the UE needs to acquire the specific control information belonging thereto, the UE may search for the second time-frequency resource by using the identifier of the second time-frequency resource, and based on a location of the time-frequency resource of the specific control information as indicated by the base station, perform de-interleaving on the second time-frequency resource to obtain the specific control information belonging thereto.

In this way, some UE not requiring to acquire the common control information may only perform de-interleaving on the specific control information to obtain the specific control information belonging thereto, thereby improving the speed of acquiring the specific control information, which thus, for the UE working on the BWP, may improve the overall speed of the UE for acquiring the control information.

It should be noted that, for the target BWP, the time-frequency resources for sending the control information are generally fixed; both the first time-frequency resource and the second time-frequency resource are part of the time-frequency resources; and the time-frequency resource for sending the common control information may be different from the time-frequency resource for sending the specific control information each time.

It should also be noted that the base station may send the arrangement order of each part of the interleaved specific control information to the UE. For example, the order is 1234 before interleaving, and 2341 after the interleaving, etc.

Optionally, for the case where the first time-frequency resource and the second time-frequency resource are time-frequency resources configured by the base station, the base station should send the identifier of the first time-frequency resource and the identifier of the second time-frequency resource to the UE, and a corresponding process may be as follows:

sending an identifier of the first time-frequency resource and an identifier of the second time-frequency resource to the UE working on the target BWP by means of a broadcast signaling, an upper-layer signaling, or a physical-layer signaling.

Among them, the identifier of the first time-frequency resource and the identifier of the second time-frequency resource may be a combination of a number of symbols and a sub-carrier frequency range. For example, the identifier of the first time-frequency resource is the number of symbols, which is 1, and the sub-carrier frequency range is 10 MHz-12 MHz; and the identifier of the second time-frequency resource is the number symbols, which is 2 and 3, and the sub-carrier frequency range is 10 MHz-12 MHz, etc.

In an implementation, after determining the first time-frequency resource and the second time-frequency resource and before sending the control information, the base station may send an identifier of the first time-frequency resource and an identifier of the second time-frequency resource to the terminal by means of a broadcast signaling, an upper-layer signaling, or a physical-layer signaling. The upper-layer signaling may be a signaling based on RRC, or a signaling sent via MAC.

In addition, in this embodiment of the present disclosure, the base station may configure different BWPs with different methods for transmitting the control information.

In this embodiment of the present disclosure, when the condition of sending the control information is met, UE satisfying the condition of acquiring common control information is determined among the UE working on the target BWP; the specific control information and common control information of each of the determined UE are interleaved, and the specific control information of each of other UE working on the target BWP than the determined UE is interleaved; and the interleaved specific control information and common control information are sent by means of the first time-frequency resource, and the interleaved specific control information of other UE is sent by means of the second time-frequency resource, so that the determined UE performs de-interleaving on the first time-frequency resource to obtain the common control information and specific control information belonging thereto, and the other UE performs de-interleaving on the second time-frequency resource to obtain the specific control information belonging thereto. In this way, for the UE satisfying the condition of acquiring the common control information, which is interleaved with the specific control information, the UE may perform de-interleaving on the common control information and specific control information to acquire the specific control information and common control information belonging thereto; and for the UE not satisfying the condition of acquiring the common control information, where only the specific control information is interleaved together, the UE may only perform de-interleaving on the UE specific control information to acquire the specific control information belonging thereto, without de-interleaving the common control information, thereby improving the speed of acquiring the specific control information, which in turn may improve the overall speed of the UE working on the target BWP for acquiring the control information.

Figure 6:
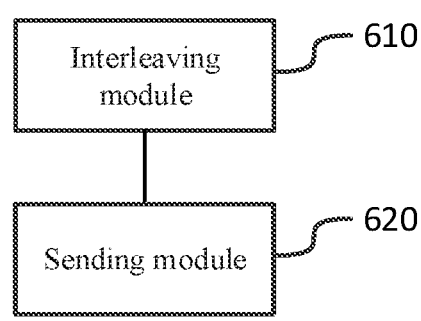
FIG. 6 is a schematic structural diagram of an apparatus for transmitting control information according to an embodiment of the present disclosure.

Based on the same technical concept, another exemplary embodiment of the present disclosure further provides an apparatus for transmitting control information, as shown in FIG. 6, which includes:

an interleaving module 610, which is configured to, when a condition of sending the control information is met, interleave common control information of each user equipment (UE) working on a target bandwidth part (BWP) and interleave specific control information of each UE; and a sending module 620, which is configured to send the interleaved common control information by means of a first time-frequency resource, and send the interleaved specific control information by means of a second time-frequency resource, wherein the first time-frequency resource and the second time-frequency resource have no intersection.

Figure 7:
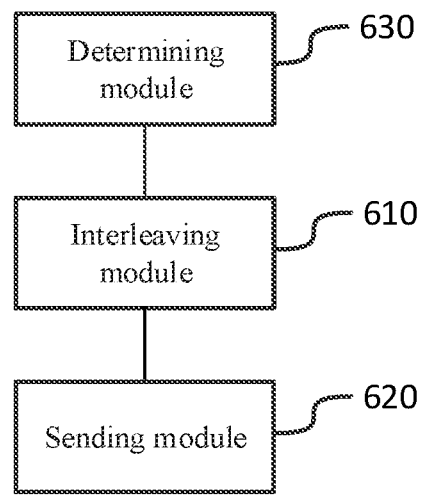
FIG. 7 is a schematic structural diagram of an apparatus for transmitting control information according to another embodiment of the present disclosure.

Optionally, as shown in FIG. 7, the apparatus further includes:

a determining module 630, which is configured to determine a number of resource element group (REG) Bundle units required to be occupied respectively by the common control information of each UE, and determining a number of REG Bundle units required to be occupied respectively by the specific control information of each UE; and the interleaving module 610 is configured to:

interleave the common control information based on the number of REG Bundle units required to be occupied respectively by the common control information of each UE, and interleave the specific control information based on the number of REG Bundle units required to be occupied respectively by the specific control information of each UE.

Optionally, the sending module 630 is further configured to:

send an identifier of the first time-frequency resource and an identifier of the second time-frequency resource to the UE working on the target BWP by means of a broadcast signaling, an upper-layer signaling, or a physical-layer signaling.

In this embodiment of the present disclosure, when the condition of sending the control information is met, the common control information of each UE working on the target BWP is interleaved, and the specific control information of each UE is interleaved; and the interleaved common control information is sent by means of the first time-frequency resource, and the interleaved specific control information is sent by means of the second time-frequency resource, so that the UE working on the target BWP performs de-interleaving on the first time-frequency resource to obtain the common control information belonging thereto, and performs de-interleaving on the second time-frequency resource to obtain the specific control information belonging thereto. In this way, the common control information and the specific control information of the UE working on the BWP are interleaved respectively. Some UE not requiring to acquire the common control information may only perform de-interleaving on the specific control information to obtain the specific control information belonging thereto, thereby improving the speed of acquiring the specific control information. Some UE not requiring to acquire the specific control information belonging thereto may only perform de-interleaving on the common control information and then execute blind detection to obtain the common control information belonging thereto, thereby improving the speed of the UE for acquiring the common control information, which, for all the UE working on the BWP, may further improve the overall speed of the UE for acquiring the control information.

It should be noted that the apparatus for transmitting control information provided by the present embodiment only takes division of all the functional modules as an example for explanation during transmitting of control information. In practice, the above functions can be finished by the different functional modules as required. That is, the internal structure of the apparatus for transmitting control information is divided into different functional modules to finish all or part of the functions described above. In addition, the apparatus for transmitting control information provided by the present embodiment has the same concept as the method for transmitting control information provided by the foregoing embodiment. Refer to the method embodiment for the specific implementation process of the terminal, which will not be repeated herein.

Figure 8:
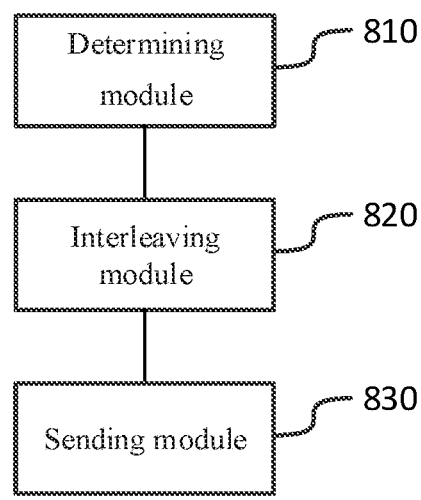
FIG. 8 is a schematic structural diagram of an apparatus for transmitting control information according to another embodiment of the present disclosure.

Based on the same technical concept, another exemplary embodiment of the present disclosure further provides an apparatus for transmitting control information, as shown in FIG. 8, which includes:

a determining module 810, which is configured to, when a condition of sending the control information is met, determine user equipment (UE) satisfying a condition of acquiring common control information among UE working on a target bandwidth part (BWP);

an interleaving module 820, which is configured to interleave specific control information and common control information of each of the determined UE and interleave specific control information of each of other UE working on the target BWP than the determined UE; and a sending module 830, which is configured to send the interleaved specific control information and common control information by means of a first time-frequency resource, and send the interleaved specific control information of the other UE by means of a second time-frequency resource, wherein the first time-frequency resource and the second time-frequency resource have no intersection.

Figure 9:
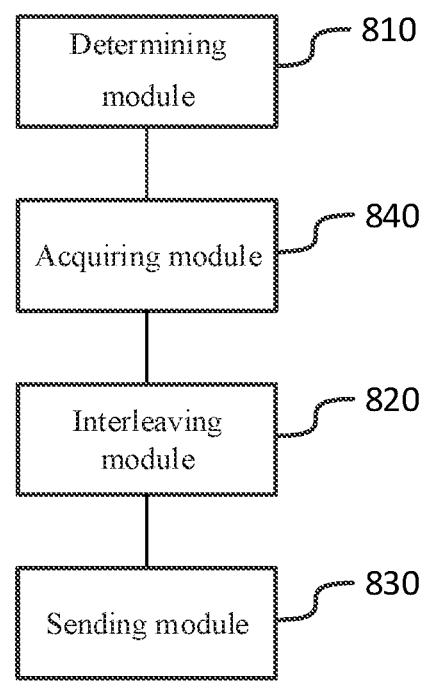
FIG. 9 is a schematic structural diagram of an apparatus for transmitting control information according to another embodiment of the present disclosure.

Optionally, as shown in FIG. 9, the apparatus further includes:

an acquiring module 840, which is configured to acquire a number of resource element group (REG) Bundle units required to be occupied respectively by the specific control information of each of the determined UE, and a number of REG Bundle units required to be occupied respectively by the common control information of each of the determined UE, and determine a number of REG Bundle units required to be occupied respectively by the specific control information of each of the other UE; and the interleaving module 820 is configured to:

interleave the specific control information and common control information of the determined UE based on the number of REG Bundle units required to be occupied respectively by the specific control information of each of the determined UE and the number of REG Bundle units required to be occupied respectively by the common control information of each UE, and interleave the specific control information of the other UE based on the number of REG Bundle units required to be occupied respectively by the specific control information of each of the other UE.

Optionally, the determining module 810 is configured to:

determine UE having a de-interleaving capability greater than a preset intensity and UE requiring to receive the common control information among the UE working on the target BWP other than the UE having the de-interleaving capability greater than the preset intensity.

Optionally, the determining module 810 is configured to:

determine UE executing a service of which a type is a preset service type, as the UE having the de-interleaving capability greater than the preset intensity.

Optionally, the determining module 810 is configured to:

determine UE of which a capability level is a preset level, as the UE having the de-interleaving capability greater than the preset intensity.

Optionally, the determining module 810 is configured to:

determine UE requiring to receive the common control information.

Optionally, the sending module 830 is further configured to:

send an identifier of the first time-frequency resource and an identifier of the second time-frequency resource to the UE working on the target BWP by means of a broadcast signaling, an upper-layer signaling, or a physical-layer signaling.

In this embodiment of the present disclosure, when the condition of sending the control information is met, UE satisfying the condition of acquiring common control information is determined among the UE working on the target BWP; the specific control information and common control information of each of the determined UE are interleaved, and the specific control information of each of other UE working on the target BWP than the determined UE is interleaved; and the interleaved specific control information and common control information are sent by means of the first time-frequency resource, and the interleaved specific control information of other UE is sent by means of the second time-frequency resource, so that the determined UE performs de-interleaving on the first time-frequency resource to obtain the common control information and specific control information belonging thereto, and the other UE performs de-interleaving on the second time-frequency resource to obtain the specific control information belonging thereto. In this way, for the UE satisfying the condition of acquiring the common control information, which is interleaved with the specific control information, the UE may perform de-interleaving on the common control information and specific control information to acquire the specific control information and common control information belonging thereto; and for the UE not satisfying the condition of acquiring the common control information, where only the specific control information is interleaved together, the UE may only perform de-interleaving on the UE specific control information to acquire the specific control information belonging thereto, without de-interleaving the common control information, thereby improving the speed of acquiring the specific control information, which in turn may improve the overall speed of the UE working on the target BWP for acquiring the control information.

It should be noted that the apparatus for transmitting control information provided by the present embodiment only takes division of all the functional modules as an example for explanation during transmitting of control information. In practice, the above functions can be finished by the different functional modules as required. That is, the internal structure of the apparatus for transmitting control information is divided into different functional modules to finish all or part of the functions described above. In addition, the apparatus for transmitting control information provided by the present embodiment has the same concept as the method for transmitting control information provided by the foregoing embodiment. Refer to the method embodiment for the specific implementation process of the terminal, which will not be repeated herein.

Persons of ordinary skills in the art can understand that all or some of the steps described in the above embodiments can be completed through hardware, or through relevant software instructed by a program stored in a non-transitory computer readable storage medium, such as a read-only memory, a disk or a CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A method for transmitting control information, comprising:
when a condition of sending the control information is met, scrambling an order of multiple parts of common control information of each user equipment (UE) working on a target bandwidth part (BWP) and then arranging the multiple parts of common control information of each UE, so that the multiple parts of common control information of each UE are not adjacent to each other, thereby completing an interleaving of the common control information; and scrambling an order of multiple parts of specific control information of each UE working on the BWP and then arranging the multiple parts of specific control information of each UE, so that the multiple parts of specific control information of each UE are not adjacent to each other, thereby completing an interleaving of the specific control information; and
sending the interleaved common control information with a first time-frequency resource, and sending the interleaved specific control information with a second time-frequency resource, wherein the first time-frequency resource and the second time-frequency resource have no intersection.

2. The method according to claim 1, further comprising:
determining a number of resource element group (REG) Bundle units required to be occupied respectively by the common control information of each UE, and determining a number of REG Bundle units required to be occupied respectively by the specific control information of each UE,
wherein the interleaving of the common control information and the interleaving of the specific control information comprise:
interleaving the common control information based on the number of REG Bundle units required to be occupied respectively by the common control information of each UE, and interleaving the specific control information based on the number of REG Bundle units required to be occupied respectively by the specific control information of each UE.

3. The method according to claim 1, further comprising:
sending an identifier of the first time-frequency resource and an identifier of the second time-frequency resource to the UE working on the target BWP with a broadcast sianaling, an upper-layer signaling, or a physical-layer signaling.

4. A method for transmitting control information, comprising:
when a condition of sending the control information is met, determining user equipment (UE) satisfying a condition of acquiring common control information among LJE working on a target bandwidth part (BWP), by determining UE having a de-interleaving capability greater than a preset intensity and UE requiring to receive the common control information among other UE working on the target BWP than the UE having the de-interleaving capability greater than the preset intensity;
interleaving specific control information and common control information of each of the determined UE and interleaving specific control information of each of other UE working on the target BWP than the determined UE; and
sending the interleaved specific control information and common control information with a first time-frequency resource, and sending the interleaved specific control information of the other UE with a second time-frequency resource, wherein the first time-frequency resource and the second time-frequency resource have no intersection.

5. The method according to claim 4, further comprising:
acquiring a number of resource element group (REG) Bundle units required to be occupied respectively by the specific control information of each of the determined UE, and a number of REG Bundle units required to be occupied respectively by the common control information of each of the determined UE, and determining a number of REG Bundle units required to be occupied respectively by the specific control information of each of the other UE,
wherein the interleaving specific control information and common control information of each of the determined UE and interleaving specific control information of each of other UE working on the target BWP than the determined UE comprises:
interleaving the specific control information and common control information of the determined UE based on the number of REG Bundle units required to be occupied respectively by the specific control information of each of the determined UE and the number of REG Bundle units required to be occupied respectively by the common control information of each UE, and interleaving the specific control information of the other UE based on the number of REG Bundle units required to be occupied respectively by the specific control information of each of the other UE.

6. The method according to claim 4, wherein the determining UE having a de-interleaving capability greater than a preset intensity comprises:
   determining UE executing a service of which a type is a preset service type, as the UE having the de-interleaving capability greater than the preset intensity.

7. The method according to claim 4, wherein the determining UE having a de-interleaving capability greater than a preset intensity comprises:
   determining UE of which a capability level is a preset level, as the UE having the de-interleaving capability greater than the preset intensity.

8. The method according to claim 4, further comprising:
   sending an identifier of the first time-frequency resource and an identifier of the second time-frequency resource to the UE working on the target BWP with a broadcast signaling, an upper-layer signaling, or a physical-layer signaling.

9. An apparatus for transmitting control information, comprising a processor and memory, wherein at least one instruction, at least one program, a code set or an instruction set is stored on the memory, and is loaded and executed by the processor to implement the method for transmitting control information according to claim 1.

10. An apparatus for transmitting control information, comprising a processor and a memory, wherein at least one instruction, at least one program, a code set or an instruction set is stored on the memory, and is loaded and executed by the processor to
   when a condition of sending the control information is met, determine user equipment (UE) satisfying a condition of acquiring common control information among UE working on a target bandwidth part (BWP), by determining UE having a de-interleaving capability greater than a preset intensity and UE requiring to receive the common control information among other UE working on the target BWP than the UE having the de-interleaving capability greater than the preset intensity;
   interleave specific control information and common control information of each of the determined UE and interleave specific control information of each of other UE working on the target BWP than the determined UE; and
   send the interleaved specific control information and common control information with a first time-frequency resource, and send the interleaved specific control information of the other UE with a second time-frequency resource, wherein the first time-frequency resource and the second time-frequency resource have no intersection.

11. The apparatus according to claim 9, wherein the at least one instruction, at least one program, code set or instruction set is further executed by the processor to:
   determine a number of resource element group (REG) Bundle units required to be occupied respectively by the common control information of each UE, and determine a number of REG Bundle units required to be occupied respectively by the specific control information of each UE,
   wherein the interleaving common control information of each UE working on a target BWP and interleaving specific control information of each UE comprises:
   interleaving the common control information based on the number of REG Bundle units required to be occupied respectively by the common control information of each UE, and interleaving the specific control information based on the number of REG Bundle units required to be occupied respectively by the specific control information of each UE.

12. The apparatus according to claim 9, wherein the at least one instruction, at least one program, code set or instruction set is further executed by the processor to:
   send an identifier of the first time-frequency resource and an identifier of the second time-frequency resource to the UE working on the target BWP with a broadcast signaling an upper-layer signaling, or a physical-layer signaling.

13. The apparatus according to claim 10, wherein the at least one instruction, at least one program, code set or instruction set is further executed by the processor to:
   acquire a number of resource element group (REG) Bundle units required to be occupied respectively by the specific control information of each of the determined UE, and a number of REG Bundle units required to be occupied respectively by the common control information of each of the determined UE, and determine a number of REG Bundle units required to be occupied respectively by the specific control information of each of the other UE,
   wherein the interleaving specific control information and common control information of each of the determined UE and interleaving specific control information of each of other UE working on the target BWP than the determined UE comprises:
   interleaving the specific control information and common control information of the determined UE based on the number of REG Bundle units required to be occupied respectively by the specific control information of each of the determined UE and the number of REG Bundle units required to be occupied respectively by the common control information of each UE, and interleaving the specific control information of the other UE based on the number of REG Bundle units required to be occupied respectively by the specific control information of each of the other UE.

14. The apparatus according to claim 10, wherein the determining UE having a de-interleaving capability greater than a preset intensity comprises:
   determining UE executing a service of which a type is a preset service type, as the UE having the de-interleaving capability greater than the preset intensity.

15. The apparatus according to claim 10, wherein the determining UE having a de-interleaving capability greater than a preset intensity comprises:
   determining UE of which a capability level is a preset level, as the UE having the de-interleaving capability greater than the preset intensity.

16. The apparatus according to claim 10, wherein the at least one instruction, at least one program, code set or instruction set is further executed by the processor to:
   send an identifier of the first time-frequency resource and an identifier of the second time-frequency resource to the UE working on the target BWP with a broadcast signaling, an upper-layer signaling, or a physical-layer signaling.

17. A communication system implementing the method according to claim 1, comprising a base station and the each UE; wherein
   the each UE working on the target BWP is configured to perform de-interleaving on the first time-frequency resource to obtain the common control information belonging thereto, and perform de-interleaving on the second time-frequency resource to obtain the specific control information belonging thereto;

the common control information and the specific control information of the UE working on the BWP are interleaved respectively;

UE not requiring to acquire the common control information is configured to only perform de-interleaving on the specific control information to obtain the specific control information belonging thereto, thereby improving the speed of acquiring the specific control information;

UE not requiring to acquire the specific control information belonging thereto is configured to only perform de-interleaving on the common control information and then execute blind detection to obtain the common control information belonging thereto, thereby improving speed of the UE for acquiring the common control information.

* * * * *